Jan. 25, 1955 — W. H. FRANK ET AL — 2,700,706
TROLLEY AND DUCT SYSTEM
Original Filed Sept. 22, 1944 — 3 Sheets-Sheet 1
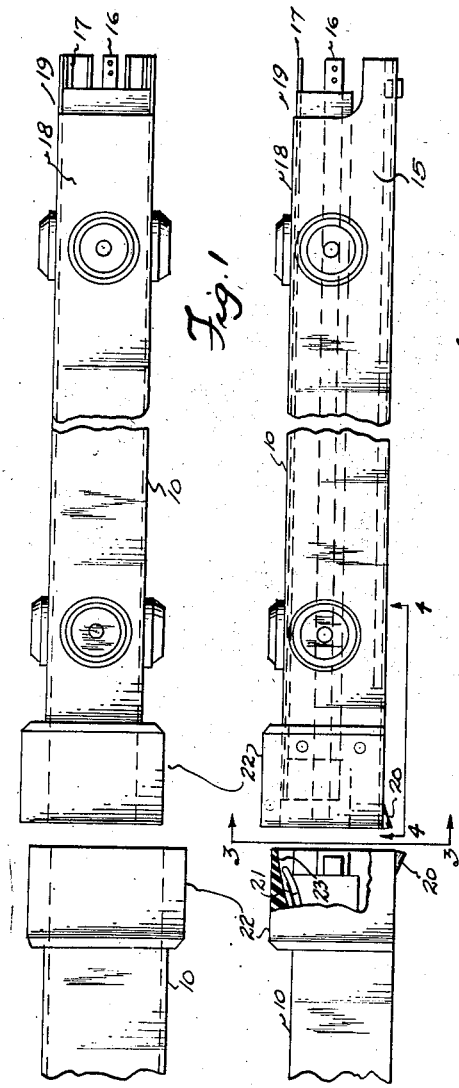
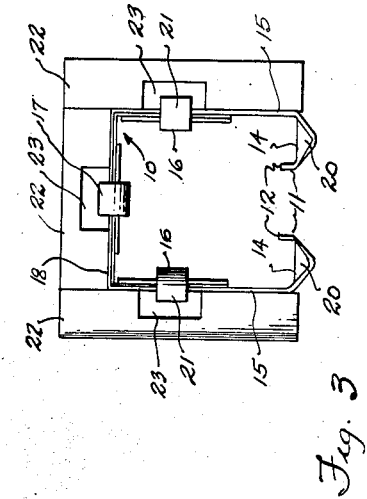
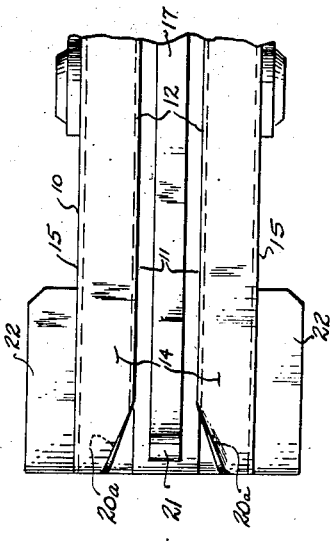
INVENTORS
William N. Frank
George Farnsworth
Daniel G. Gullen Jan. 25, 1955 W. H. FRANK ET AL 2,700,706
TROLLEY AND DUCT SYSTEM
Original Filed Sept. 22, 1944 3 Sheets-Sheet 2
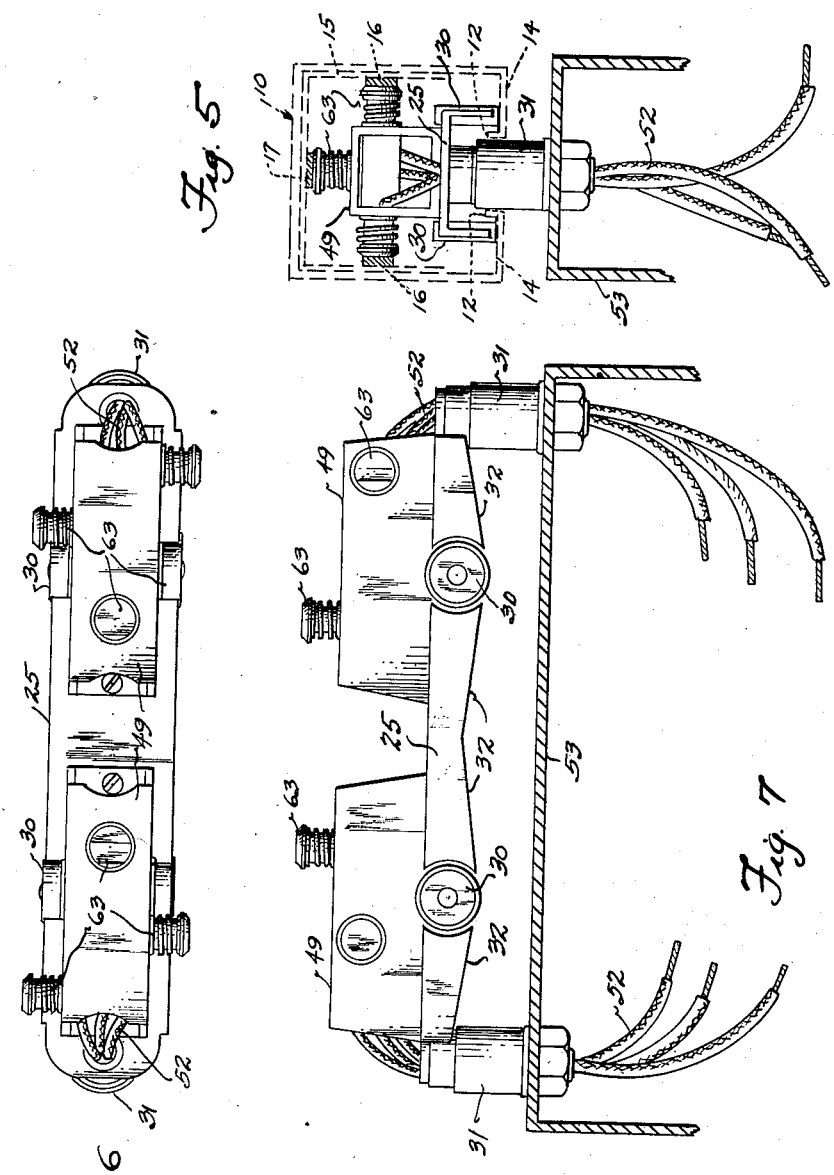
INVENTORS
William H. Frank
BY + George Farnsworth
Daniel G. Cullen, atty.

Jan. 25, 1955
W. H. FRANK ET AL
2,700,706
TROLLEY AND DUCT SYSTEM
Original Filed Sept. 22, 1944
3 Sheets-Sheet 3
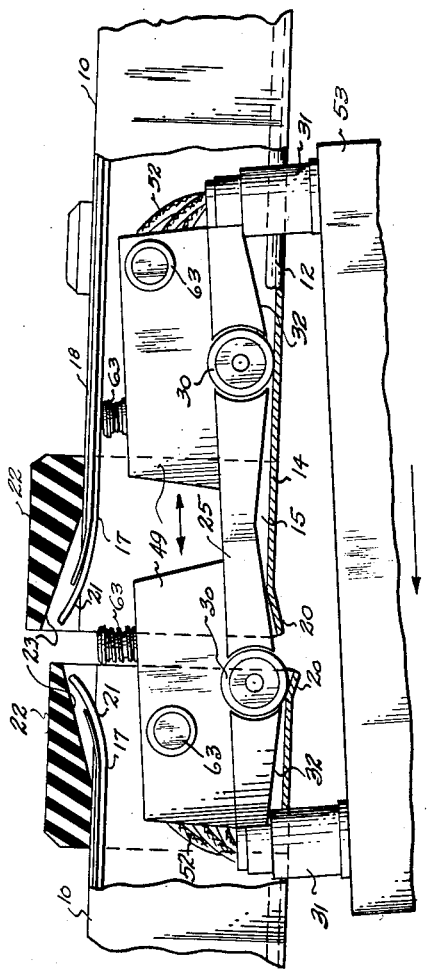
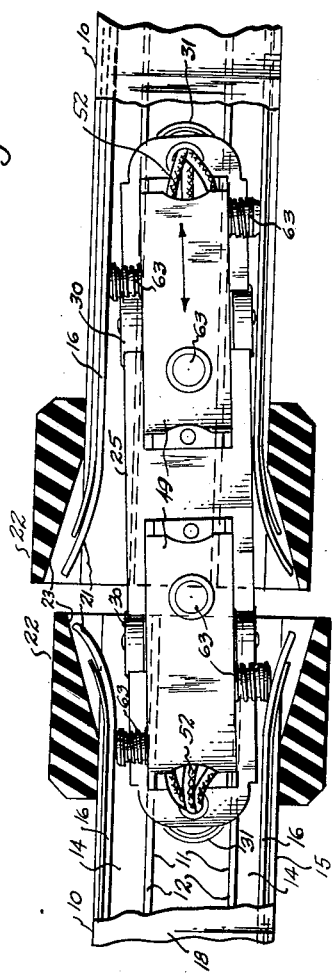
INVENTORS
William H. Frank +
BY George Farnsworth
Daniel G. Cullen, atty

United States Patent Office

2,700,706
Patented Jan. 25, 1955

2,700,706

TROLLEY AND DUCT SYSTEM

William H. Frank and George Farnsworth, Detroit, Mich., assignors to BullDog Electric Products Co., Detroit, Mich., a corporation of West Virginia Continuation of application Serial No. 555,218, September 22, 1944. This application January 24, 1951, Serial No. 207,574

1 Claim. (Cl. 191—28)

This application relates to trolley and duct systems and particularly discloses a construction for facilitating transfer of trolleys from one duct run to another. This application is a continuation of co-pending and subsequently abandoned application Serial No. 555,218, filed September 22, 1944, for Improvements in Trolley and Trolley Duct Systems.

A typical trolley and duct system, wherein a trolley or current collector rolls along a slotted tube duct, is shown in a prior patent of H. J. L. Frank et al., No. 2,007,893 of July 9, 1935.

Where such trolley duct systems are used in crane, hoist, and monorail systems, it often happens that the movable trolley is to be transferred from one duct run to another such duct run, mechanically and electrically independent from it, as, for example, at switches, crossovers, and other transfer points. In such instances, the duct runs are separated. Such runs and switch sections may be separately supplied with electrical power through feed-in means similar to that shown in Patent No. 2,090,725 issued August 24, 1937, and assigned to the assignee of the present application. Their ends may not be in absolute alignment, misalignment often existing due to various causes such as constructional variations, load deflections, expansion and contraction, variations in curvature, and the like; and often there may be substantial gaps between the adjacent ends of duct runs to be crossed by a trolley. Thus, the transfer of trolleys, and the free movement of trolleys from one duct run to another, when the two duct runs are misaligned, and often with a gap between their ends, presents a problem solved by the construction herein shown.

In addition, it is important that, in the transfer, continuity of electric current flow through the trolley be maintained, and this problem also is solved by the construction herein shown.

In this application there is shown a construction for free transfer and movement of trolleys from one duct section to another, across a gap between them despite misalignment of the duct sections, without, however, interrupting the continuity of the flow of electric current from the duct to the trolley during the transfer.

The appended drawings show such a construction. In these drawings:

Fig. 1 is a top plan view of one complete length of duct, with the adjacent end of an incomplete length of duct shown nearby.

Fig. 2 is a side view of the parts shown in Fig. 1.

Fig. 3 is a view as if on line 3—3 of Fig. 2.

Fig. 4 is a view as if on line 4—4 of Fig. 2, being a partial bottom view.

Fig. 5 is an end view of a trolley in a duct.

Fig. 6 is a top plan view of a trolley per se.

Fig. 7 is a side view of a trolley per se.

Fig. 8 is a top plan view showing a trolley transferring from one duct section to another.

Fig. 9 is a side view showing a trolley transferring from one duct section to another.

The duct

A duct section comprises a slotted metal tube 10 whose bottom wall is slotted at 11 with the slot edges being referenced 12. The bottom wall portions 14 between the slot 11 and the sides 15 form rails for the trolley. Additional rails are shown at 16 and 17; these are in the form of bus bars insulatedly mounted on the sides 15 and on the top 18, respectively, of the duct section.

Each end of the duct section has its side and top wall cut away as shown at 19.

Where a duct section is to be used in an installation where one end of it is not mechanically secured to an adjacent end of another duct section, as in a stationary duct run, but is rather to be mechanically free of it, as in a bridge installation, where adjacent ends of duct sections are not mechanically intersecured, and where the adjacent ends of the duct sections, when associated, are apt to have a gap between them and to be somewhat out of line with respect to each other, then the end that is not to be secured to another duct section is formed slightly differently from the standard end of a duct section, as will now be described with reference to Figs. 1-4, which show the right hand section as having a standard right hand end and a flared or "special" left hand end.

The flared left hand end has its bottom rail portions 14 flared downwardly, as indicated, to provide lips 20. These are cut out or flared, as at 20a. The ends of the bus bars 16 and 17 are also flared outwardly as indicated at 21. Shielding blocks or collars 22 of insulation material are mounted on the top and side walls respectively of the flared duct ends to shield and insulate the flared ends of the bus bars left unshielded by the cut away portion 19 of the duct itself. The shielding blocks are secured, as indicated, to the metal tube 10 on the top and side walls. The shielding blocks are formed with clearance cut-outs 23 to accommodate the flared ends of the bus bars.

The trolley

A trolley for use with a stationary duct run generally of the type shown in this application is similar to the one shown in a prior application Serial No. 495,590, filed July 21, 1943, now Patent No. 2,361,536 dated October 31, 1944, and comprises a metal carriage 25 having supporting rollers 30 which ride on the bottom rails 14 of the duct. The carriage supports housing 49 in which are resiliently mounted collectors 63 for engaging and sliding along the bus bars 16—17. The collectors are connected to the branch conductors 52 shielded by a box 53.

The carriage also mounts on vertical axes two rollers 31, these being at the very ends of the carriage and these being formed in a manner to roll against and along the edges 12 of the bottom slot 11 of the duct sections. The rollers 31 assist in guiding the trolley as it moves from one duct section to another, shifting the trolley laterally where the two ends are out of lateral alignment. In addition, the carriage has its lower edge bevelled so as to provide cam surfaces, as indicated at 32, arranged in a manner to cooperate with the flared lips 20 of the bottom portions 14 of the duct sections to assist in guiding the trolley as it moves from one duct section to another, lifting the forward end of the trolley as it leaves a duct section whose end is slightly lower than the end of the duct section into which the trolley is entering.

The trolley shuttles across the gap during the transfer from one section of duct to the other and yet moves freely along a duct between gaps, thus having all of the characteristics of trolleys not particularly intended to be transferred across gaps.

It will be noted that the rollers 31 and their bearings are hollow, so that the electrical conductors 52 may pass from the housings 49 to the load supported by the trolley, through these rollers 31, in a manner not to be endangered by the moving parts, being protected by the rollers 31.

It will also be observed that the duplicate set of collectors 63, at the ends of the trolley, insure that at all times certain ones of the collectors for all phases engage live bus bars of the system and thus maintain continuity of electrical current supply during the crossing of the gaps in the system by the trolleys.

It will also be observed that the supporting rollers 30 project slightly below the lower edge 32 of the trolley so that these rollers ride along the lower edge surfaces of a duct freely, without interference from the edges 32.

Now having described the trolley and duct arrangement herein disclosed, reference should be had to the claim which follows.

We claim:

In a trolley duct type electrical distribution system, a plurality of slotted bottom metallic duct runs having their ends misaligned, the duct runs having rigid bus bar conductors mounted therein on the side and top walls, said side and top walls and said conductors being outwardly flared at the ends of said duct runs to facilitate passage of a trolley from one duct run to another, an insulating cap surrounding the top and side walls of said duct run at the end thereof, the inner walls of said end cap being flared outwardly to receive said flared duct ends and conductors, a trolley having longitudinally-spaced, horizontally-axled rollers to provide support for the trolley in its passage along the duct runs, said trolley having resiliently biased electrical contact means spaced longitudinally along the sides and top thereof, said contact means being in duplicate sets with one set at each end of the trolley to insure continuous electrical contact as the trolley moves from one duct run to another, said trolley having a vertically-axled roller at each end thereof to engage the lower walls adjacent to said duct run slot, each of said vertically-axled rollers having an opening therethrough to receive lead conductors extending from said trolley contact means, said trolley including a base having side walls, the lower edges of said side walls being shaped to form inclined surfaces extending downwardly from each end and from the center of said base to each of said spaced horizontally-axled rollers, said inclined surfaces interacting with the flared portions of the lower slotted wall of said duct run to facilitate the entrance of the trolley into the ends of the duct runs.

References Cited in the file of this patent

UNITED STATES PATENTS

| | | |
|---|---|---|
| 539,418 | Cotton | May 21, 1895 |
| 873,522 | Eddowes | Dec. 10, 1907 |
| 889,559 | Tomlinson | June 2, 1908 |
| 2,007,893 | Frank et al. | July 9, 1935 |
| 2,014,929 | Frank | Sept. 17, 1935 |
| 2,061,515 | Frank et al. | Nov. 17, 1936 |
| 2,254,142 | Glasgow | Aug. 26, 1941 |